(12) United States Patent
Li et al.

(10) Patent No.: US 11,245,135 B2
(45) Date of Patent: Feb. 8, 2022

(54) SECONDARY BATTERY WITH INSULATING TAPES

(71) Applicant: Qinghai Contemporary Amperex Technology Limited, Qinghai (CN)

(72) Inventors: Zhiling Li, Qinghai (CN); Baiqing Li, Qinghai (CN); Hui Li, Qinghai (CN); Tingting Zhang, Qinghai (CN); Jun Liu, Qinghai (CN); Xiaoxi Zhang, Qinghai (CN)

(73) Assignee: Qinghai Contemporary Amperex Technology Limited, Qinghai (CN)

( * ) Notice: Subject to any disclaimer, the term of this patent is extended or adjusted under 35 U.S.C. 154(b) by 405 days.

(21) Appl. No.: 16/525,448

(22) Filed: Jul. 29, 2019

(65) Prior Publication Data

US 2020/0280103 A1    Sep. 3, 2020

(30) Foreign Application Priority Data

Mar. 1, 2019   (CN) .......................... 201910155379.6

(51) Int. Cl.
*H01M 10/0587*   (2010.01)
*H01M 2/02*   (2006.01)
(Continued)

(52) U.S. Cl.
CPC ..... *H01M 10/0587* (2013.01); *H01M 10/049* (2013.01); *H01M 50/116* (2021.01)

(58) Field of Classification Search
CPC .................. H01M 10/0431; H01M 10/0587
See application file for complete search history.

(56) References Cited

U.S. PATENT DOCUMENTS

| 2003/0087150 A1* | 5/2003 | Chung | H01M 50/46 |
| | | | 429/129 |
| 2004/0142236 A1* | 7/2004 | Kim | H01M 10/0587 |
| | | | 429/144 |

(Continued)

FOREIGN PATENT DOCUMENTS

| CN | 102903883 A | 1/2013 |
| CN | 206878126 U | 1/2018 |

(Continued)

OTHER PUBLICATIONS

International Search Report and Written Opinion dated May 15, 2020, Patent Application No. PCT/CN2020/076823, 8 pages.

(Continued)

*Primary Examiner* — Imran Akram
(74) *Attorney, Agent, or Firm* — Davis Wright Tremaine LLP

(57) ABSTRACT

Disclosed is a secondary battery, comprising an electrode component, a case, a top cover component and a first insulating tape. The electrode component includes a first electrode unit. The first electrode unit is wound into a flat structure and has a first termination line formed at a winding tail-end; a negative plate of an outermost circle of the first electrode unit is located outside a positive plate of an outermost circle; and the first insulating tape at least covers a portion of the first termination line. A surface of the first electrode unit includes a first flat surface; the first flat surface is located at one end of the first electrode unit that is close to the first side wall in the thickness direction; and the first insulating tape is at least partially in close contact with the first flat surface.

18 Claims, 7 Drawing Sheets

(51) Int. Cl.
*H01M 10/04* (2006.01)
*H01M 50/116* (2021.01)

(56) References Cited

U.S. PATENT DOCUMENTS

| | | |
|---|---|---|
| 2005/0069764 A1 | 3/2005 | Kodama et al. |
| 2006/0154138 A1* | 7/2006 | Miyamoto ............ H01M 50/116 |
| | | 429/130 |
| 2006/0251962 A1* | 11/2006 | Kim ..................... H01M 50/411 |
| | | 429/130 |
| 2010/0035132 A1 | 2/2010 | Park |
| 2010/0310912 A1* | 12/2010 | Kim ..................... H01M 10/052 |
| | | 429/94 |
| 2012/0028091 A1 | 2/2012 | Park |
| 2013/0130100 A1 | 5/2013 | Kurata et al. |
| 2015/0104684 A1* | 4/2015 | Kim ....................... H01M 50/20 |
| | | 429/94 |
| 2017/0244129 A1* | 8/2017 | Seong ............... H01M 10/0587 |

FOREIGN PATENT DOCUMENTS

| | | |
|---|---|---|
| CN | 110190339 A | 8/2019 |
| JP | 2012043564 A | 3/2012 |
| JP | 2018106833 A | 7/2018 |
| WO | 2013080966 A1 | 6/2013 |

OTHER PUBLICATIONS

European Extended Search Report dated Feb. 7, 2020, Patent Application No. 19187561.6-1108, 8 pages.
Communication pursuant to Article 94(3) EPC received in related European Application No. EP19187561.6, dated Aug. 3, 2021, 4 pgs.

* cited by examiner

SECONDARY BATTERY WITH INSULATING TAPES

CROSS-REFERENCE TO RELATED APPLICATION

This application claims the priority benefit of Chinese Patent Application No. 201910155379.6 filed on Mar. 1, 2019 and entitled "SECONDARY BATTERY", the disclosure of which is incorporated by reference herein in its entirety.

TECHNICAL FIELD

The present disclosure relates to the field of batteries, and particularly, to a secondary battery.

BACKGROUND

A secondary battery comprises an electrode component and a case for accommodating the electrode component.

SUMMARY

Some embodiments of the present disclosure provide a secondary battery, comprising an electrode component, a case, a top cover component and a first insulating tape. The electrode component includes a first electrode unit; the first electrode unit is located at one end of the electrode component in a thickness direction; the first electrode unit includes a positive plate, a negative plate and a separator; and the separator separates the positive plate from the negative plate. The first electrode unit is wound into a flat structure and has a first termination line formed at a winding tail-end; a negative plate of an outermost circle of the first electrode unit is located outside a positive plate of an outermost circle; and the first insulating tape at least covers a portion of the first termination line. The case has a first side wall and an accommodating cavity; the electrode component is accommodated in the accommodating cavity; the first side wall is located at one side of the electrode component in the thickness direction; the case is electrically connected with the positive plate of the first electrode unit; and the top cover component is sealingly connected with the case. A surface of the first electrode unit includes a first flat surface; the first flat surface is located at one end of the first electrode unit that is close to the first side wall in the thickness direction; and the first insulating tape is at least partially in close contact with the first flat surface.

The surface of the first electrode unit further includes a second flat surface, a first narrow surface and a second narrow surface; the second flat surface is located at one end of the first electrode unit that is away from the first side wall in the thickness direction; and the first narrow surface and the second narrow surface are respectively located at both ends of the first electrode unit in a width direction. Along a winding direction of the first electrode unit, the first flat surface, the second narrow surface, the second flat surface and the first narrow surface are sequentially arranged. Both the first termination line and a starting end of the first insulating tape are located on the second flat surface. Along the winding direction of the first electrode unit, the first insulating tape extends from the starting end and is sequentially wound over the first termination line and the first narrow surface.

A trailing end of the first insulating tape is located on the first flat surface and provided close to a boundary between the first flat surface and the second narrow surface; or, along the winding direction of the first electrode unit, the first insulating tape extends, wound over the second narrow surface, and has its trailing end located on the second flat surface.

In the width direction of the first electrode unit, a distance between the starting end of the first insulating tape and the first termination line is greater than 0.5 cm.

An area of the first insulating tape is S1; a sum of areas of the first flat surface, the second flat surface, the first narrow surface and the second narrow surface is S2; and a ratio of S1 to S2 is 50% to 90%.

The electrode component further includes a second electrode unit; the second electrode unit is located at the other end of the electrode component in the thickness direction; the second electrode unit includes a positive plate, a negative plate and a separator; and the separator separates the positive plate from the negative plate. The second electrode unit is wound into a flat structure and has a second termination line formed at a winding tail-end, and a negative plate of an outermost circle of the second electrode unit is located outside a positive plate of an outermost circle. The secondary battery further comprises a second insulating tape, and the second insulating tape at least covers a portion of the second termination line. The case further has a second side wall, and the second side wall is located at the other side of the electrode component in the thickness direction. A surface of the second electrode unit includes a third flat surface; the third flat surface is located at one end of the second electrode unit that is close to the second side wall in the thickness direction; and the second insulating tape is at least partially in close contact with the third flat surface.

The surface of the second electrode unit further includes a fourth flat surface; the fourth flat surface is located at one end of the second electrode unit that is close to the first electrode unit in the thickness direction; and both a starting end of the second insulating tape and the second termination line are located on the fourth flat surface.

The negative plate includes a negative electrode current collector and two negative electrode active material layers respectively coated on two surfaces of the negative electrode current collector. Along a length direction parallel to a winding shaft of the first electrode unit, the first electrode unit has two end faces provided opposite to each other. In the length direction, edges of the first insulating tape exceed the negative electrode active material layers and do not exceed the end faces.

The first insulating tape includes a base body and a bonding layer, and the base body is bonded to the surface of the first electrode unit through the bonding layer.

The base body has a thickness of 10 μm to 50 μm, and an elastic modulus of 1 Gpa to 6 Gpa; and the bonding layer has a thickness of 0.5 μm to 15 μm, and a bonding strength greater than 0.05 N/mm$^2$.

The secondary battery further comprises a protective member located inside the case, and the protective member separates the electrode component and the first insulating tape from the case.

In the present disclosure, the first insulating tape is in close contact with the surface of the first electrode unit, so that the metal foreign matter adhering to the surface of the first electrode unit can be decreased; further, when the first electrode unit expands, the first insulating tape can separate the first side wall from the first electrode unit, so as to prevent the metal foreign matter from piercing the separator, prevent the negative plate from being electrically connected with the first side wall, reduce a short circuit risk, and improve insulation property and safety performance. The first insulating tape can simultaneously cover a portion of a region of the first termination line and a portion of a region of the first flat surface, and thus, the first insulating tape can not only fix the winding tail-end of the first electrode unit to prevent the first electrode unit from being unwound, but also can protect the first electrode unit from being pierced by the metal foreign matter to reduce a short circuit risk.

Figure 1:
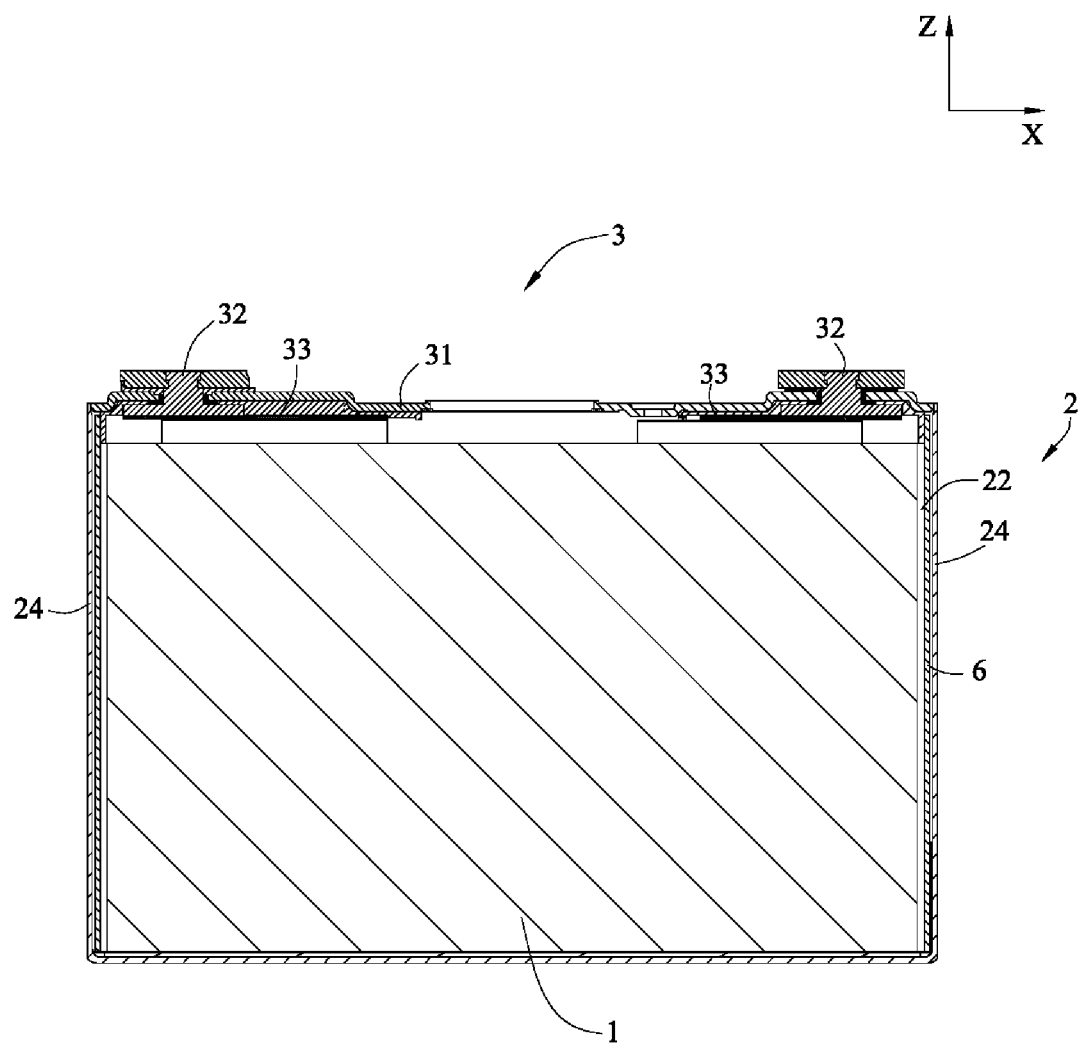
FIG. 1 is a schematic diagram of a secondary battery according to the present disclosure.

Reference signs are described as follows:

| 1 | electrode component | 22 | accommodating cavity |
|---|---|---|---|
| 11 | first electrode unit | 23 | second side wall |
| 111 | first flat surface | 24 | third side wall |
| 112 | second flat surface | 3 | top cover component |
| 113 | first narrow surface | 31 | top cover plate |
| 114 | second narrow surface | 32 | electrode terminal |
| 115 | end face | 33 | adapter piece |
| 12 | second electrode unit | 4 | first insulating tape |
| 121 | third flat surface | 41 | starting end |
| 122 | fourth flat surface | 42 | trailing end |
| 123 | third narrow surface | 4a | base body |
| 124 | fourth narrow surface | 4b | bonding layer |
| 13 | third electrode unit | 5 | second insulating tape |
| 14 | fourth electrode unit | 51 | starting end |
| 15 | positive plate | 52 | trailing end |
| 151 | positive electrode current collector | 6 | protective member |
| 152 | positive electrode active material layer | L1 | first termination line |
| 16 | negative plate | L2 | second termination line |
| 161 | negative electrode current collector | W | winding direction |
| 162 | negative electrode active material layer | X | width direction |
| 17 | separator | Y | thickness direction |
| 2 | case | Z | length direction |
| 21 | first side wall | | |
| 7 | third insulating tape | L3 | third termination line |

DETAILED DESCRIPTION

In order to make objects, technical solutions and advantages of the embodiments of the present disclosure more apparent, the present disclosure will be further explained in detail below in conjunction with the drawings and the embodiments. It should be understood that the specific embodiments descried here are merely used for explaining the present disclosure, and not intended to limit the present disclosure.

In the description of the present disclosure, unless otherwise unambiguously specified and defined, terms like "first", "second" and "third" are merely provided for the purpose of description other than expressing or implying their relative importance; the term "a plurality of" refers to two or more (including two); unless otherwise specified or explained, the term "connection" should be construed in its broad sense, for example, it may be fixed connection, or detachable connection, or integral connection, or electrical connection, or signal connection; and "connection" may be direct connection, or may also be indirect connection through an intermediate medium. It will be understood by those ordinarily skilled in the art that the specific meanings of the above terms vary in different contexts.

In the description of the present disclosure, it should be understood that, such directional and positional terms as "upper" and "lower" in the embodiments of the present disclosure are described in terms of the angle shown in the accompanying drawings, and should not be construed as limitation to the embodiments of the present disclosure. Hereinafter, the present disclosure will be further described in detail through specific embodiments and in conjunction with the accompanying drawings.

The inventors find during the invention process that, if a case of a secondary battery is conductive with a positive electrode of the electrode component, the case maintains a higher potential to prevent corrosion. However, a short circuit risk of the secondary battery is increased. For example, in a process of assembling the secondary battery, metal foreign matter will remain on an outer surface of the electrode component; and the electrode component expands during working process and squeezes the case at a later stage of a cycle, at which time the metal foreign matter may easily pierces a separator of the electrode component, and connect a negative electrode of the electrode component with the case, causing a short circuit and triggering a safety risk.

Figure 2:
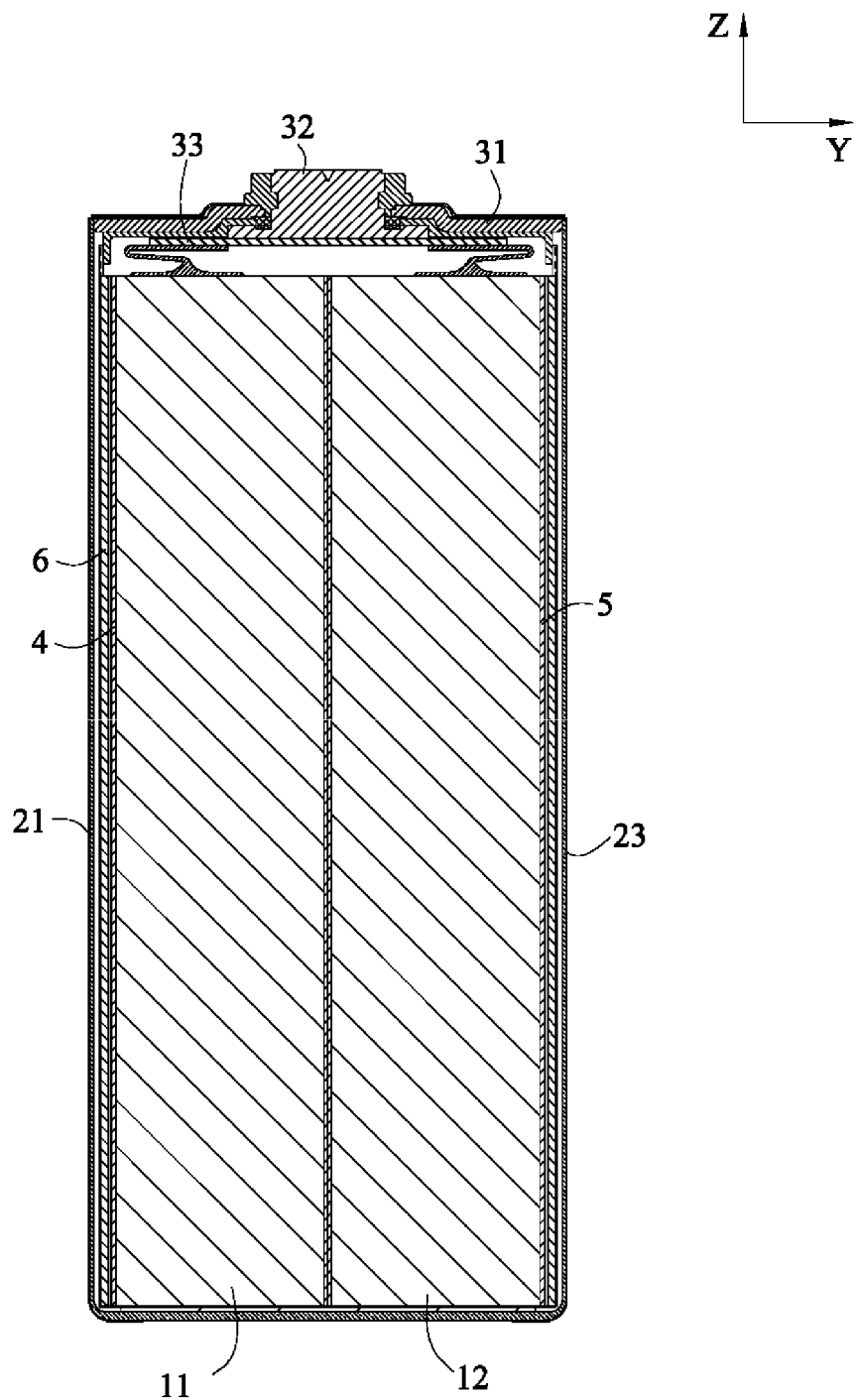
FIG. 2 is another schematic diagram of the secondary battery according to the present disclosure.
Figure 3:
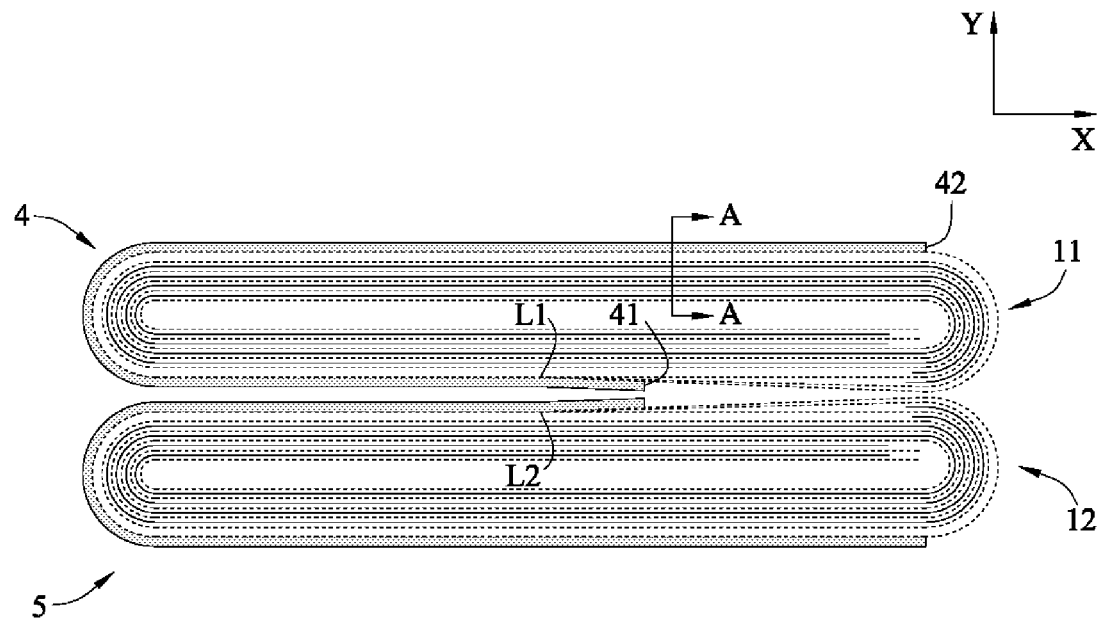
FIG. 3 is a schematic diagram of an electrode component and an insulating tape according to the present disclosure.

In view of above, with reference to FIG. 1 and FIG. 2, a secondary battery according to the present disclosure comprises an electrode component 1, a case 2, a top cover component 3 and a first insulating tape 4.

The electrode component 1 includes one or more electrode units; and in some embodiments, there are a plurality of electrode units sequentially arranged along a thickness direction Y.

Each electrode unit include a positive plate 15, a negative plate 16 and a separator 17; and the separator 17 separates the positive plate 15 from the negative plate 16. The electrode unit may be formed by spirally winding the positive plate 15, the negative plate 16 and the separator 17; and the electrode unit is pressed by pressure to form a flat structure.

The positive plate 15 includes a positive electrode current collector 151 and two positive electrode active material layers 152 respectively coated on two surfaces of the positive electrode current collector 151; the positive electrode current collector 151 may be an aluminum foil, and the positive electrode active material layers 152 includes lithium manganate or lithium iron phosphate. The positive electrode current collector 151 has a positive electrode blank region that is not covered by the positive electrode active material layers 152. The negative plate 16 includes a negative electrode current collector 161 and two negative electrode active material layer 162 respectively coated on two surfaces of the negative electrode current collector 161; the negative electrode current collector 161 may be a copper foil, and the negative electrode active material layers 162 includes graphite or silicon. The negative electrode current collector 161 has a negative electrode blank region that is not covered by the negative electrode active material layers 162.

The electrode component 1 includes a first electrode unit 11, and the first electrode unit 11 is located at one end of the electrode component 1 in the thickness direction Y.

During working process of the secondary battery, lithium ions within the positive electrode active material layer 152 need to pass through the separator 17 and be embedded in the negative electrode active material layer 162. At the time of winding, if it is wound up with the positive plate 15 (i.e., a negative plate 16 of an outermost circle of the first electrode unit is located inside a positive plate 15 of an outermost circle), then lithium ions of the positive plate 15 of the outermost circle cannot be embedded in the negative plate 16, thus causing a lithium precipitation problem. In an example, the negative plate 16 of the outermost circle of the first electrode unit 11 is located outside the positive plate 15 of the outermost circle.

Figure 4:
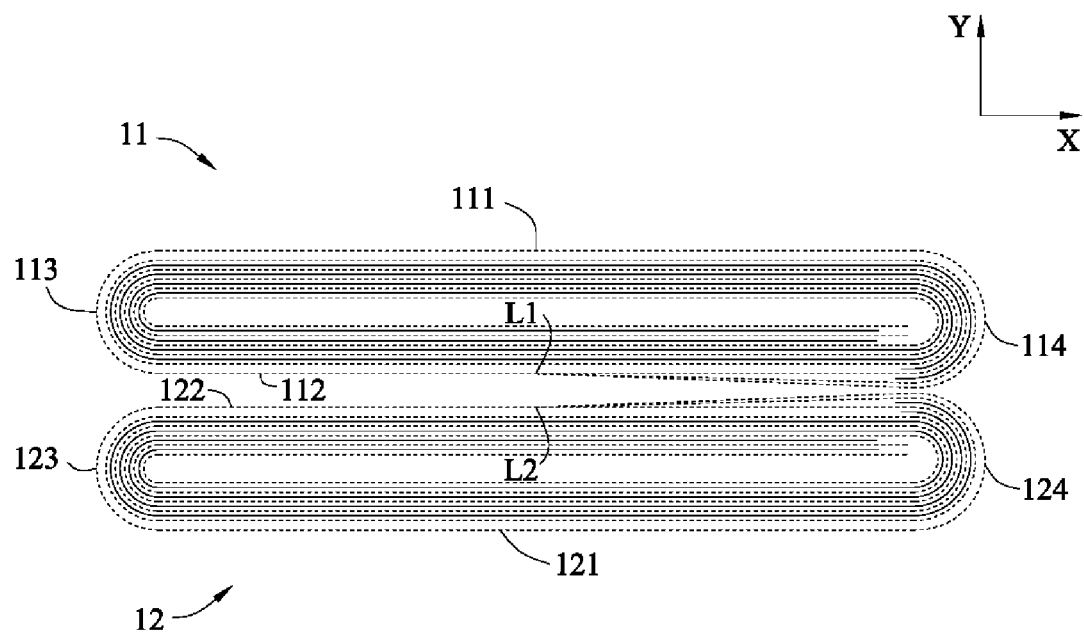
FIG. 4 is another schematic diagram of FIG. 3, in which the insulating tape is omitted.

Of course, in order to ensure insulation property, a separator 17 of an outermost circle of the first electrode unit 11 is located outside the negative plate 16 of the outermost circle. With reference to FIG. 4, a winding tail-end of the separator 17 is exposed and extended, and approximately, the tail-end of the separator 17 forms a straight line on a surface of the first electrode unit 11 in a length direction Z; in other words, the first electrode unit 11 has a first termination line L1 formed at the winding tail-end.

The first insulating tape 4 can be fixed to the surface of the first electrode unit 11 by bonding, etc. In an example, the first insulating tape 4 at least covers a portion of the first termination line L1. At this time, the first insulating tape 4 can fix the winding tail-end of the first electrode unit 11 to prevent the first electrode unit 11 from being unwound.

An accommodating cavity 22 is formed inside the case 2, to accommodate the electrode component 1 and electrolyte. The accommodating cavity 22 has an opening formed at one end, and the electrode component 1 can be placed into the accommodating cavity 22 through the opening. Since the first insulating tape 4 can prevent the first electrode unit 11 from being unwound, the electrode component 1 can be more easily placed into the accommodating cavity 22. The case 2 may be made of a conductive metal material such as aluminum or aluminum alloy.

The case 2 may be prismatic; and specifically, the case 2 includes a first side wall 21, a second side wall 23, a third side wall 24 and a bottom wall. The first side wall 21 and the second side wall 23 are respectively provided at two sides of the electrode component 1 in the thickness direction Y. There are two third side walls 24, which are respectively provided at two sides of the electrode component 1 in a width direction X. The first side wall 21, the second side wall 23 and the two third side walls 24 are connected together to form a frame body that approximates a rectangle. The bottom wall is provided at a lower side of the first side wall 21, the second side wall 23 and the third side walls 24, and is connected with the first side wall 21, the second side wall 23 and the third side walls 24. The first side wall 21, the second side wall 23, the third side walls 24 and the bottom wall enclose the accommodating cavity 22 of the case 2. As compared with the third side walls 24, the first side wall 21 and the second side wall 23 each have a larger area.

With reference to FIG. 1, the top cover component 3 includes a top cover plate 31, an electrode terminal 32 and an adapter piece 33. The top cover plate 31 is coupled to the case 2 and covers the opening of the case 2, to seal the opening of the case 2. The electrode terminal 32 is provided at the top cover plate 31, and the adapter piece 33 can be respectively electrically connected with the electrode terminal 32 and the electrode component 1 by soldering, etc. In a length direction Z, the top cover plate 31 and the bottom wall of the case 2 are respectively located at two sides of the electrode component 1.

There may be two electrode terminals 32, a positive electrode terminal 32 is electrically connected with the positive plate 15 through one adapter piece 33, and a negative electrode terminal 32 is electrically connected with the negative plate 16 through the other adapter piece 33. The top cover plate 31 may be a metal plate, and the top cover plate 31 is electrically connected with the positive electrode terminal 32 and insulated from the negative electrode terminal 32. The case 2 can be sealingly connected with the top cover plate 31 by soldering, etc.

In known technologies, the electrolyte easily corrodes the case 2, affecting performance and service life of the secondary battery; however, in the present disclosure, the case 2 is electrically connected with the positive plate 15 through the top cover plate 31 and the positive electrode terminal 32, so that the case 2 can maintain a high potential, to avoid electrochemical corrosion, and improve the performance and the service life of the secondary battery.

The surface of the first electrode unit 11 includes a first flat surface 111, a second flat surface 112, a first narrow surface 113 and a second narrow surface 114. The first flat surface 111 is located at one end of the first electrode unit 11 that is close to the first side wall 21 in the thickness direction Y; the second flat surface 112 is located at one end of the first electrode unit 11 that is away from the first side wall 21 in the thickness direction Y. The first narrow surface 113 and the second narrow surface 114 are respectively located at two ends of the first electrode unit 11 in the width direction X. Two ends of the first narrow surface 113 are respectively connected with the first flat surface 111 and the second flat surface 112; and two ends of the second narrow surface 114 are respectively connected with the first flat surface 111 and the second flat surface 112.

The first flat surface 111 is substantially a flat surface perpendicular to the thickness direction Y, the second flat surface 112 is substantially a flat surface perpendicular to the thickness direction Y, at least a portion of the first narrow surface 113 is a circular arc surface, and at least a portion of the second narrow surface 114 is a circular arc surface. As compared with the first flat surface 111 and the second flat surface 112, the first narrow surface 113 and the second narrow surface 114 each have a smaller area. In addition, the outermost circle of the first electrode unit 11 is the separator 17, so the first flat surface 111, the second flat surface 112, the first narrow surface 113 and the second narrow surface 114 are all surfaces having the separator 17 exposed.

Along a winding direction W of the first electrode unit 11, the first flat surface 111, the second narrow surface 114, the second flat surface 112 and the first narrow surface 113 are sequentially arranged. It is added here that the thickness direction Y and the width direction X are perpendicular to each other, and the thickness direction Y and the width direction X are both perpendicular to a winding shaft of the first electrode unit 11. The winding direction W is a direction encircling the winding shaft of the first electrode unit 11.

If the first flat surface 111 of the first electrode unit 11 is exposed, then metal foreign matter generated in a process of assembling the secondary battery is easily sputtered, adhering to the first flat surface 111. During working process, the first electrode unit 11 will expand, and expansion of the first electrode unit 11 in the thickness direction Y is the most serious. During expansion, the first flat surface 111 will press the first side wall 21, and under an action of pressure, the metal foreign matter adhering to the first flat surface 111 easily pierces the separator 17, and electrically conducts the negative electrode active material layer 162 of the negative plate 16 with the first side wall 21; and particularly, when the secondary battery is in a fully charged state, heat is rapidly generated inside the first electrode unit 11 to cause a safety risk.

In an example, the first insulating tape 4 is at least partially in close contact with the first flat surface 111. The first insulating tape 4 can separate the first flat surface 111 from the first side wall 21, and increase strength of connection between the first insulating tape 4 and the surface of the first electrode unit 11.

Hereinafter, a forming process of the secondary battery according to the present disclosure will be briefly described below:

(i) Wind the positive plate 15, the negative plate 16 and the separator 17 integrally to prepare a plurality of electrode units; bond the first insulating tape 4 to a surface of one electrode unit (i.e., the first electrode unit 11) after winding formation. At least make the first insulating tape 4 cover a portion of a region of the first termination line L1 and a portion of a region of the first flat surface 111 when bonding the first insulating tape 4.

(ii) Stack the plurality of electrode units together, the plurality of electrode units constituting the electrode component 1; provide the first electrode unit 11 bonded with the first insulating tape 4 at one end of the electrode component 1 during stacking.

(iii) Respectively solder positive electrode blank regions and negative electrode blank regions of the plurality of electrode units to the two adapter pieces 33, and then respectively solder the two adapter pieces 33 to the two electrode terminals 32 of the top cover component 1.

(iv) Place the electrode component 1 and the first insulating tape 4 bonded to the electrode component 1 into the case 2, and then solder the case 2 with the top cover plate 31 of the top cover component 3 to implement sealing of the case 2.

In known technologies, when the electrode terminal and the adapter piece are soldered, the metal foreign matter generated by soldering easily adheres to an outer surface of the electrode component. The electrode component expands during working process and squeezes the case at a later stage of a cycle, at which time the metal foreign matter easily pierces the separator of the electrode component, and electrically connects the negative plate of the electrode component with the case, causing a short circuit and triggering a safety risk.

However, in the present disclosure, before the adapter piece 33 and the electrode terminal 32 are soldered together, firstly the first insulating tape 4 is bonded to the surface of the first electrode unit 11 of the electrode component 1; and when the adapter piece 33 and the electrode terminal 32 are soldered together, the first insulating tape 4 can protect the first electrode unit 11, so as to decrease the metal foreign matter directly adhering to the surface of the first electrode unit 11.

When the electrode component 1 expands, the first insulating tape 4 can separate the first side wall 21 from the first flat surface 111 of the first electrode unit 11, so as to prevent the metal foreign matter remaining between the first insulating tape 4 and the case 2 from piercing the separator 17, and prevent the negative electrode active material layer 162 of the negative plate 16 from being electrically connected with the first side wall 21, to reduce a short circuit risk, and improve insulation property.

If an interstice is left between the first insulating tape 4 and the first flat surface 111, the metal foreign matter may remain between the first insulating tape 4 and the first flat surface 111. When the electrode component 1 expands, the metal foreign matter may still easily pierce the separator 17, and even pierce the negative plate 16, affecting the performance of the secondary battery. However, in the present disclosure, the first insulating tape 4 is in close contact with the first flat surface 111, so the metal foreign matter hardly enters between the first insulating tape 4 and the first flat surface 111, to avoid that the metal foreign matter pierces the separator 17 and the negative plate 16.

In the present disclosure, the first insulating tape 4 can simultaneously cover a portion of the region of the first termination line L1 and a portion of the region of the first flat surface 111, so the first insulating tape 4 can not only fix the winding tail-end of the first electrode unit 11 to prevent the first electrode unit 11 from being unwound, but also protect the first electrode unit 11 from being pierced by the metal foreign matter to reduce a short circuit risk.

When the first electrode unit 11 expands, the first electrode unit 11 is subjected to a binding stress of the first side wall 21. If the first termination line L1 is located on the first flat surface 111, flatness of the first flat surface 111 may be poor, and in this case, the stress will be concentrated toward the vicinity of the first termination line L1. In the vicinity of the first termination line L1, the negative plate 16 of the outermost circle is subjected to a larger stress, which may cause the negative plate 16 to break. In addition, the stress concentrated on the first termination line L1 also tends to crush the first insulating tape 4, causing a short circuit risk. In an example, the first termination line L1 is located on the second flat surface 112. In this case, flatness of the first flat surface 111 is good, and the stress received by the negative plate 16 of the outermost circle is relatively uniform, so that a risk of breakage of the negative plate 16 of the outermost circle is reduced.

In order that the first termination line L1 can be covered, a starting end 41 of the first insulating tape 4 is also located on the second flat surface 112. In the winding direction W of the first electrode unit 11, the first insulating tape 4 extends from the starting end 41 and is sequentially wound over the first termination line L1 and the first narrow surface 113. In the width direction X, the starting end 41 of the first insulating tape 4 is located on a side of the first termination line L1 that is close to the second narrow surface 114.

After winding formation of the first electrode unit 11, firstly the starting end 41 of the first insulating tape 4 is bonded to the second flat surface 112, and then the first insulating tape 4 is wound in the winding direction W to make the first insulating tape 4 fitted to the second flat surface 112, the first narrow surface 113 and the first flat surface 111. The first insulating tape 4 and the first electrode unit 11 are wound in a same winding direction W, which can effectively prevent the first electrode unit 11 from being unwound in the process of winding the first insulating tape 4.

The second narrow surface 114 is substantially an arc, and a relatively large interstice is left between the second narrow surface 114 and the first side wall 21 as well as between the second narrow surface 114 and the third side wall 24, so when the first electrode unit 11 expands, the second narrow surface 114 is less susceptible to forces applied by the first side wall 21 and the third side wall 24. That is to say, even if the second narrow surface 114 is not covered by the first insulating tape 4, the second narrow surface 114 is not easily pierced by the metal foreign matter. As compared with that the second narrow surface 114 is covered by the first insulating tape 4, in this case, the first insulating tape 4 may be saved and cost may be reduced in this embodiment.

A trailing end 42 of the first insulating tape 4 is located on the first flat surface 111 and close to a boundary between the first flat surface 111 and the second narrow surface 114, so that an area of the first flat surface 111 that is covered by the first insulating tape 4 is maximized, to reduce a short circuit risk, and improve insulation property. In an example, the trailing end 42 of the first insulating tape 4 is flush with the boundary, a certain error allowed of course.

Figure 7:
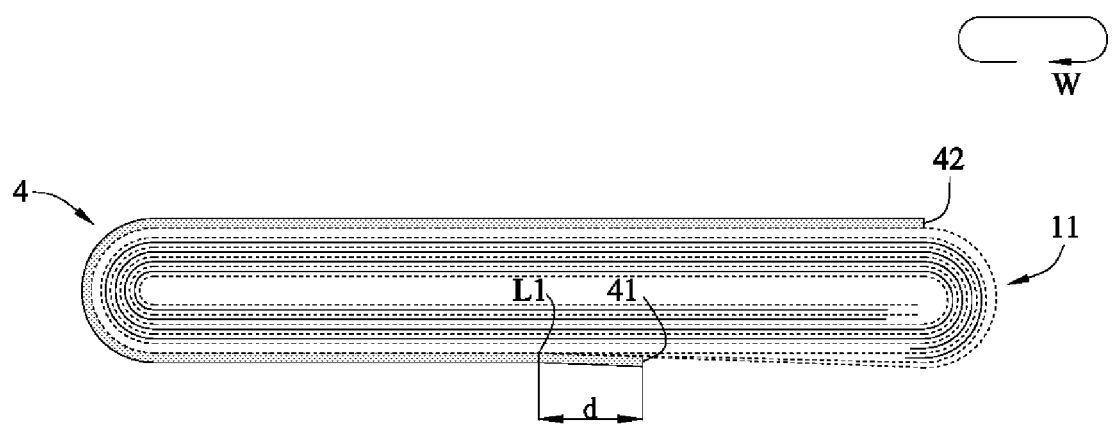
FIG. 7 is a cross-sectional view of FIG. 6.

With reference to FIG. 7, in the width direction X of the first electrode unit 11, a distance d between the starting end 41 of the first insulating tape 4 and the first termination line L1 is greater than 0.5 cm. The larger the value of d, the higher the bonding strength of the first insulating tape 4 at the first termination line L1, and the less easily the first electrode unit 11 is unwound. If the value of d is too small, for example, less than 0.5 cm, when the first electrode unit 11 expands, a portion of the first insulating tape 4 that is located between the starting end 41 and the first termination line L1 is easily separated from the first electrode unit 11, resulting unwinding of the first electrode unit 11 and affecting the performance of the secondary battery.

An area of the first insulating tape 4 is S1, and a sum of areas of the first flat surface 111, the second flat surface 112, the first narrow surface 113 and the second narrow surface 114 is S2. If a ratio of S1 to S2 is too small, a region of the first electrode unit 11 that is not covered by the first insulating tape 4 is too large, and a risk that the first electrode unit 11 is pierced by the metal foreign matter is relatively high. When the first electrode unit 11 expands, the first insulating tape 4 can function to bind the first electrode unit 11 from the outside, so as to reduce deformation of the first electrode unit 11; however, if the ratio of S1 to S2 is too large, the first electrode unit 11 is hard to be deformed, so a gap between the positive plate 15 and the negative plate 16 is contracted, extruding a local electrolyte, and triggering a lithium precipitation problem. Therefore, preferably, the ratio of S1 to S2 is 50% to 90%. For example, the ratio of S1 to S2 may be 50%, 55%, 60%, 65%, 70%, 75%, 80%, 85% or 90%, including any values therein and all ranges and subranges.

Figure 5:
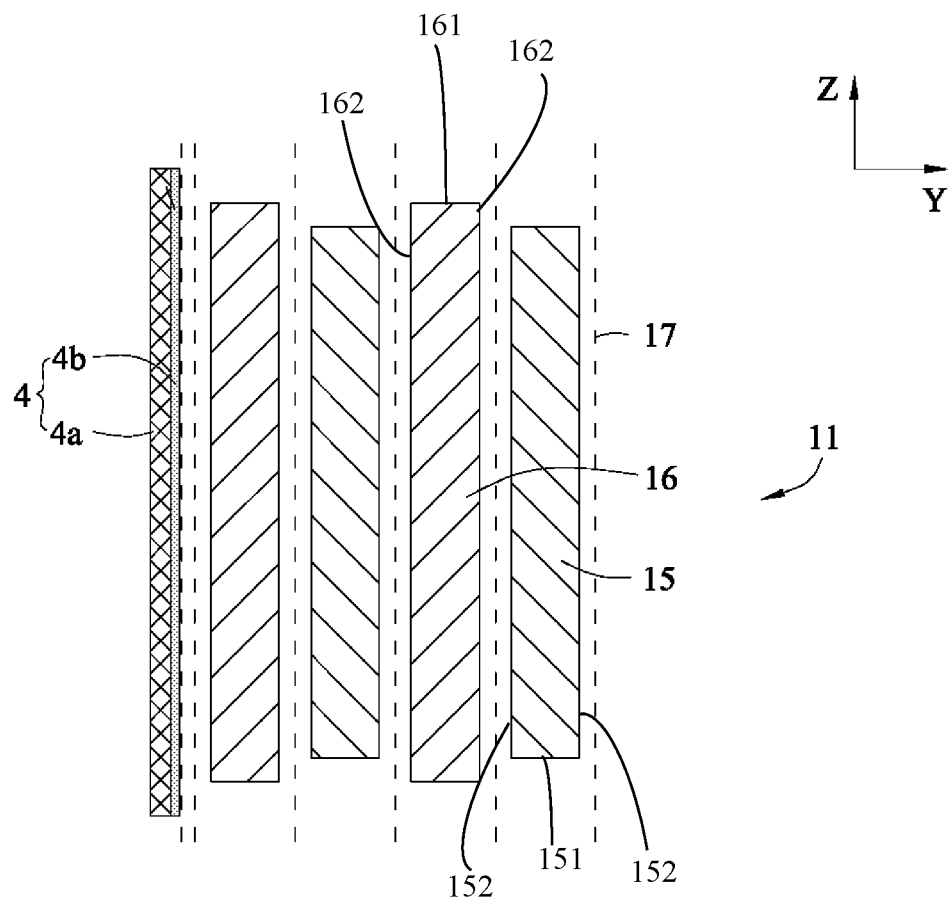
FIG. 5 is a cross-sectional view taken along line A-A of FIG. 3.
Figure 6:
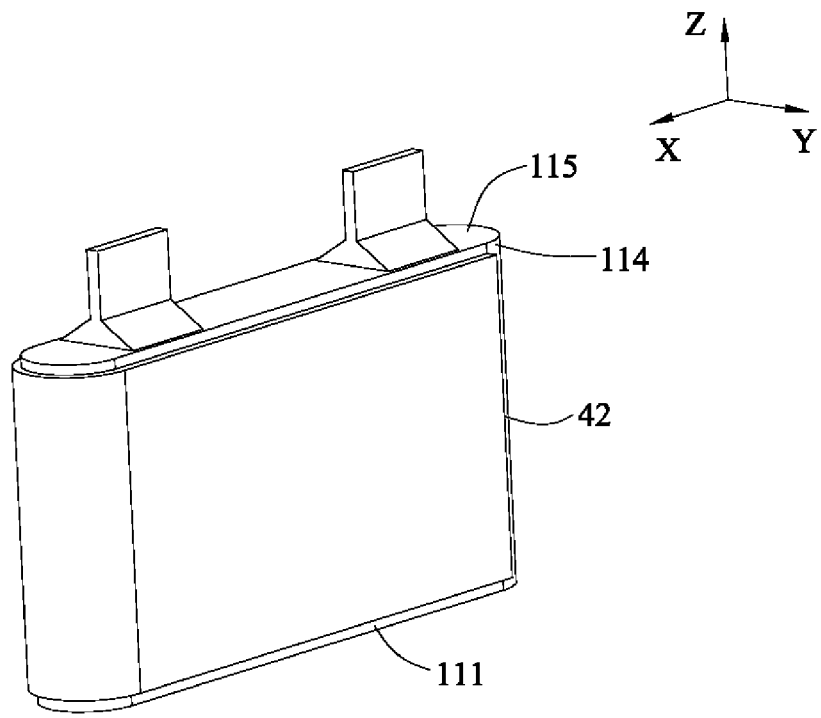
FIG. 6 is an assembly diagram of a first electrode unit and a first insulating tape according to the present disclosure.

In order to ensure that lithium ions of the positive plate 15 can be embedded in the negative plate 16 as well as possible, along the length direction Z parallel to the winding shaft of the first electrode unit 11, a size of the negative electrode active material layer 162 of the negative plate 16 is usually larger than a size of the positive electrode active material layer 152 of the positive plate 15. Specifically, with reference to FIG. 5, at one end of the first electrode unit 11 in the length direction Z, one end portion of the negative electrode active material layer 162 exceeds one end portion of the positive electrode active material layer 152; at the other end of the first electrode unit 11 in the length direction Z, the other end portion of the negative electrode active material layer 162 exceeds the other end portion of the positive electrode active material layer 152. In order to ensure insulation property, in the length direction Z, a size of the separator 17 is generally larger than the size of the negative electrode active material layer 162; at one end of the first electrode unit 11 in the length direction Z, one end portion of the separator 17 exceeds one end portion of the negative electrode active material layer 162; and at the other end of the first electrode unit 11 in the length direction Z, the other end portion of the separator 17 exceeds the other end portion of the negative electrode active material layer 162. In this case, the separator 17 completely covers the positive electrode active material layer 152 and the negative electrode active material layer 162 in the length direction Z.

In an example, in the length direction Z, edges of the first insulating tape 4 exceed the negative electrode active material layer 162 of the negative plate 16. That is to say, at one end of the first electrode unit 11 in the length direction Z, one edge of the first insulating tape 4 exceeds one end portion of the negative electrode active material layer 162; at the other end of the first electrode unit 11 in the length direction Z, the other edge of the first insulating tape 4 exceeds the other end portion of the negative electrode active material layer 162. In this case, in the length direction Z, the first insulating tape 4 can completely cover the negative electrode active material layer 162, so as to improve insulation property, minimize the risk of electrical connection between the negative electrode active material layer 162 and the first side wall 21, and improve safety performance.

Along the length direction Z parallel to the winding shaft of the first electrode unit 11, the first electrode unit 11 has two end faces 115 provided opposite each other. Specifically, after winding formation of the first electrode unit 11, the separator 17 is wound with a plurality of circles at both edges in the length direction Z, and each edge approximately forms into a face; and the face formed by each edge is referred as the end face 115. Fine slits are left at the two end faces 115, and the electrolyte can enter the inside of the first electrode unit 11 through the slits, so as to improve wettability.

Along the length direction Z, the edges of the first insulating tape 4 do not exceed the end faces 115; that is to say, in the length direction Z, the first insulating tape 4 is located between the two end faces 115 of the first electrode unit 11. If an edge of the first insulating tape 4 exceeds the end face 115, then during assembly or use, a portion of the first insulating tape 4 that exceeds the end face 115 is easily bent onto the end face 115, so as to block the slit on the end face 115, affecting wettability and causing a lithium precipitation risk.

The first insulating tape 4 includes a base body 4a and a bonding layer 4b; and the base body 4a is bonded to the surface of the first electrode unit 11 through the bonding layer 4b.

The base body 4a may be made of a flexible polymer, for example, PMMA or PET. The bonding layer 4b may be made of acrylate or ethyl acetate. In the present disclosure, the base body 4a is directly bonded to the surface of the first electrode unit 11 through the bonding layer 4b, and there is no interstice between the first insulating tape 4 and the first electrode unit 11, so that the metal foreign matter is prevented from entering between the first insulating tape 4 and the first electrode unit 11.

In the present disclosure, although the first insulating tape 4 can reduce the metal foreign matter adhering to the surface of the first electrode unit 11, yet the metal foreign matter still adheres to an outer surface of the first insulating tape 4, so the first insulating tape 4 needs to have a sufficient thickness to avoid being pierced by the metal foreign matter. In addition, since the first electrode unit 11 will be deformed due to expansion during use, it shall be ensured that the first insulating tape 4 can be elastically deformed correspondingly with expansion and contraction of the first electrode unit 11, so as to ensure cycle performance and safety performance of the secondary battery.

In this embodiment, the base body has a thickness of 10 μm to 50 μm, and an elastic modulus of 1 Gpa to 6 Gpa.

In a process of assembling the secondary battery, metal foreign matter generated by soldering may have non-uniform sizes. When the thickness of the base body 4a is less than 10 μm, metal foreign matter having a larger size may still pierce the first insulating tape 4, resulting in electrical connection between the negative plate 16 and the first side wall 21, which causes a short circuit risk. When the thickness of the base body 4a is greater than 50 μm, the first insulating tape 4 has a relatively large volume and occupies internal space of the case 2. Therefore, the thickness of the base body 4a is limited to 10 μm to 50 μm, which can effectively reduce a short circuit risk, and at a same time, ensure that the first insulating tape 4 does not excessively occupy the space of the case 2. For example, the thickness of the base body 4a may be 10 μm, 15 μm, 20 μm, 25 μm, 30 μm, 35 μm, 40 μm, 45 μm or 50 μm, including any values therein and all ranges and subranges. In an example, the thickness of the base body 4a is 12 μm to 30 μm.

When the elastic modulus of the base body 4a is less than 1 Gpa, the base body 4a is highly susceptible to plastic deformation under expansion pressure, resulting in a decreased thickness and a weakened strength of the base body 4a; and at this time, the metal foreign matter may pierce the first insulating tape 4, causing electrical connection between the negative plate 16 and the first side wall 21, and triggering a short circuit risk. When the elastic modulus of the base body 4a is greater than 6 Gpa, the base body 4a is hardly deformed under the expansion pressure, that is to say, the base body 4a binds expansion of the first electrode unit 11; and under an action of the binding force, the local electrolyte of the first electrode unit 11 is extruded, which causes a phenomenon of insufficient electrolyte, so that lithium ions cannot pass through the separator 17, triggering lithium precipitation. Therefore, the elastic modulus of the base body 4a is limited to be greater than 1 Gpa and less than 6 Gpa, which can effectively reduce a short circuit risk, and at a same time, avoid lithium precipitation, to improve cycle performance. For example, the elastic modulus of the base body 4a may be 1 Gpa, 1.5 Gpa, 2 Gpa, 2.5 Gpa, 3 Gpa, 3.5 Gpa, 4 Gpa, 4.5 Gpa, 5 Gpa, 5.5 Gpa or 6 Gpa, including any values therein and all ranges and subranges. In an example, the elastic modulus of the base body 4a is 1.2 Gpa to 4.5 Gpa.

The bonding layer 4b has a thickness of 0.5 μm to 15 μm. If the thickness of the bonding layer 4b is less than 0.5 μm, the bonding layer has a relatively low bonding strength, which tends to cause the base body 4a to be separated from the first electrode unit 11, resulting in a failed protective function of the base body 4a. If the thickness of the bonding layer 4b is greater than 15 μm, the bonding layer 4b occupies excessively large space, which lowers an energy density of the secondary battery. For example, the thickness of the bonding layer 4b may be 0.5 μm, 1 μm, 1.5 μm, 2 μm, 3 μm, 4 μm, 5 μm, 6 μm, 7 μm, 8 μm, 9 μm, 10 μm, 11 μm, 12 μm, 13 μm, 14 μm, 15 μm, including any values therein and all ranges and subranges.

When the first electrode unit 11 expands, stress concentration occurs between the separator 17 and the bonding layer 4b; and in an example, in order to avoid separation of the separator 17 from the bonding layer 4b, the bonding strength of the bonding layer 4b is greater than 0.05 N/mm$^2$.

In order to further improve insulation property and to avoid damage to the first insulating tape 4 when placed into the case 2, the secondary battery further comprises a protective member 6 located inside the case 2. The protective member 6 may be wound around the outside of the electrode component 1 and the first insulating tape 4, to separate the electrode component 1 from the case 2 and to separate the first insulating tape 4 from the case 2. The protective member 6 roughly encloses a rectangular cavity, while the electrode component 1 and the first insulating tape 4 are accommodated in the cavity and surrounded by the protective member 6. Specifically, in step (iv), before the electrode component 1 and the first insulating tape 4 bonded to the electrode component 1 are placed into the case 2, firstly the protective member 6 is wound around the outside of the electrode component 1 and the first insulating tape 4, then the protective member 6, the electrode component 1 and the first insulating tape 4 together are placed inside the case 2, and finally the case 2 is soldered with the top cover plate 31 of the top cover component 3 to implement sealing of the case 2.

The electrode component 1 further includes a second electrode unit 12. The second electrode unit 12 and the first electrode unit 11 are respectively located at two ends of the electrode component 1 in the thickness direction Y. The second electrode unit 12 is substantially identical in structure to the first electrode unit 11.

The second electrode unit 12 includes a positive plate 15, a negative plate 16 and a separator 17; and the separator 17 separates the positive plate 15 from the negative plate 16.

The second electrode unit 12 is wound into a flat structure and has a second termination line L2 formed at a winding tail-end. In an example, a negative plate 16 of an outermost circle of the second electrode unit 12 is located outside a positive plate 15 of an outermost circle of the second electrode unit 12, so that lithium ions of the positive plate 15 of the outermost circle can be embedded in the negative plate 16 as well as possible, to reduce a lithium precipitation problem.

The secondary battery further comprises a second insulating tape 5; and the second insulating tape 5 at least covers a portion of the second termination line L2. The second insulating tape 5 can be fixed to a surface of the second electrode unit 12 by bonding, etc. The second insulating tape 5 can fix the winding tail-end of the second electrode unit 12 to prevent the second electrode unit 12 from being unwound.

With reference to FIG. 4, the surface of the second electrode unit 12 includes a third flat surface 121, a fourth flat surface 122, a third narrow surface 123 and a fourth narrow surface 124. The third flat surface 121 is located at one end of the second electrode unit 12 that is close to the second side wall 23 in the thickness direction Y, and the fourth flat surface 122 is located at one end of the second electrode unit 12 that is close to the first electrode unit 11 in the thickness direction Y. The third narrow surface 123 and the fourth narrow surface 124 are respectively located at both ends of the second electrode unit 12 in the width direction X. Two ends of the third narrow surface 123 are respectively connected with the third flat surface 121 and the fourth flat surface 122, and two ends of the fourth narrow surface 124 are respectively connected with the third flat surface 121 and the fourth flat surface 122.

The third flat surface 121 is a flat surface substantially perpendicular to the thickness direction Y, the fourth flat surface 122 is a flat surface substantially perpendicular to the thickness direction Y, at least a portion of the third narrow surface 123 is a circular arc surface, and at least a portion of the fourth narrow surface 124 is a circular arc surface. As compared with the third flat surface 121 and the fourth flat surface 122, the third narrow surface 123 and the fourth narrow surface 124 each have a smaller area.

In a winding direction of the second electrode unit 12, the third flat surface 121, the fourth narrow surface 124, the fourth flat surface 122, and the third narrow surface 123 are sequentially arranged. In an example, the winding direction of the second electrode unit 12 is opposite to the winding direction of the first electrode unit 11.

The second insulating tape 5 is at least partially in close contact with the third flat surface 121. In the present disclosure, the second insulating tape 5 can simultaneously cover a portion of a region of the second termination line L2 and a portion of a region of the third flat surface 121, and thus, the second insulating tape 5 can not only fix the winding tail-end of the second electrode unit 12 to prevent the second electrode unit 12 from being unwound, but also protect the second electrode unit 12 from being pierced by the metal foreign matter to reduce a short circuit risk.

In an example, the second termination line L2 of the second insulating tape 5 is located on the fourth flat surface 122, so that flatness of the third flat surface 121 can be ensured, so as to reduce a risk of breakage of the negative plate 16 of the outermost circle.

Similarly, a starting end 51 of the second insulating tape 5 is also located on the fourth flat surface 122. In the winding direction of the second electrode unit 12, the second insulating tape 5 extends from the starting end 51 and is sequentially wound over the second termination line L2 and the third narrow surface 123.

Further, a trailing end of the second insulating tape 5 is provided close to a boundary between the third flat surface 121 and the fourth narrow surface 124.

Figure 8:
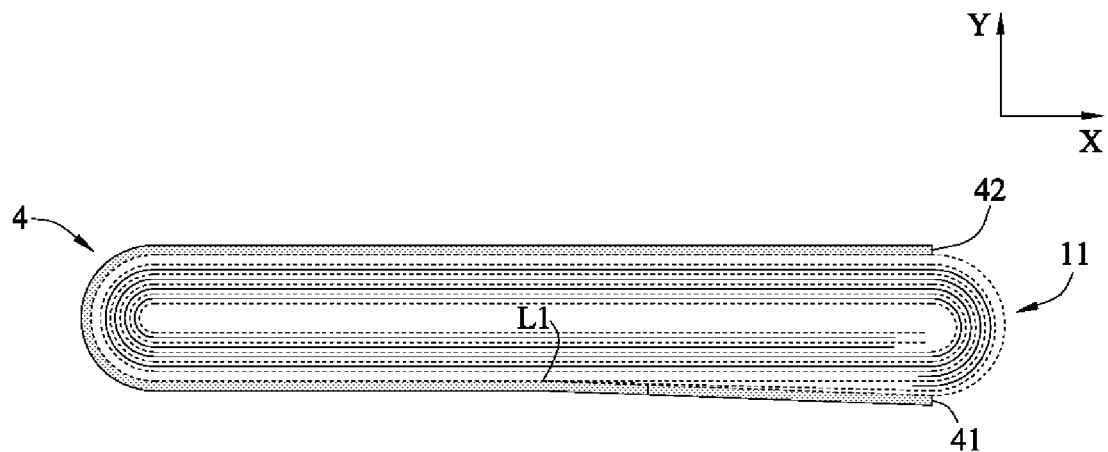
FIG. 8 is another schematic diagram of an electrode component and an insulating tape according to the present disclosure.

With reference to FIG. 8, in some embodiments, the electrode component 1 includes only one electrode unit, that is, the first electrode unit 11.

In this case, the first electrode unit 11 has a first flat surface 111 provided close to a first side wall 21, and a second flat surface 112 provided close to a second side wall 23. A starting end 41 of a first insulating tape 4 is provided close to a boundary between the second flat surface 112 and a fourth narrow surface 124; and a trailing end 42 of the first insulating tape 4 is provided close to a boundary between the first flat surface 111 and the fourth narrow surface 124. The first insulating tape 4 can cover the first flat surface 111 and the second flat surface 112 to the greatest extent, to prevent the first flat surface 111 and the second flat surface 112 from being pierced by metal foreign matter, and reduce a short circuit risk.

Figure 9:
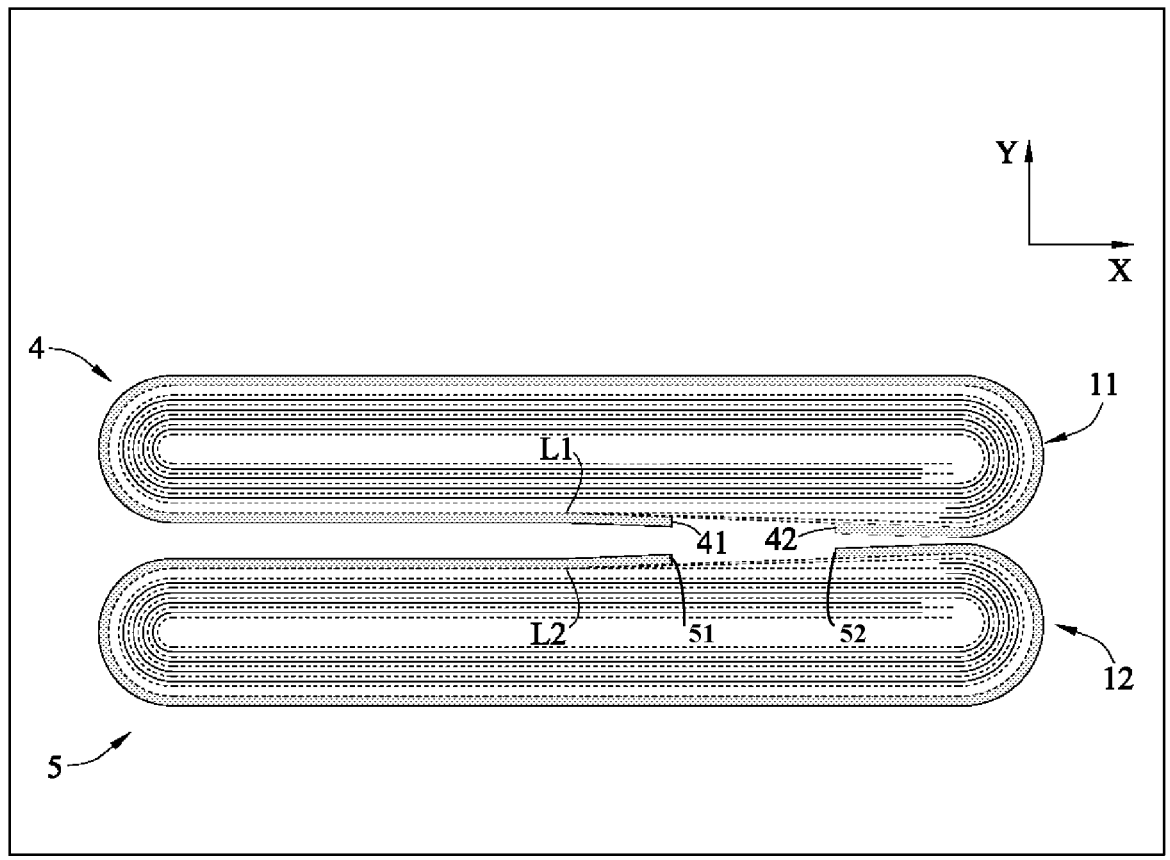
FIG. 9 is another schematic diagram of an electrode component and an insulating tape according to the present disclosure.

With reference to FIG. 9, in some embodiments, in a winding direction of a first electrode unit 11, a first insulating tape 4 extends, wound over a second narrow surface 114, and has its trailing end 42 located on a second flat surface. The first insulating tape 4 is wound around the first electrode unit 11 almost by one circle, which can enlarge a region of the first electrode unit 11 that is covered by the first insulating tape 4, and improve insulation property.

Figure 10:
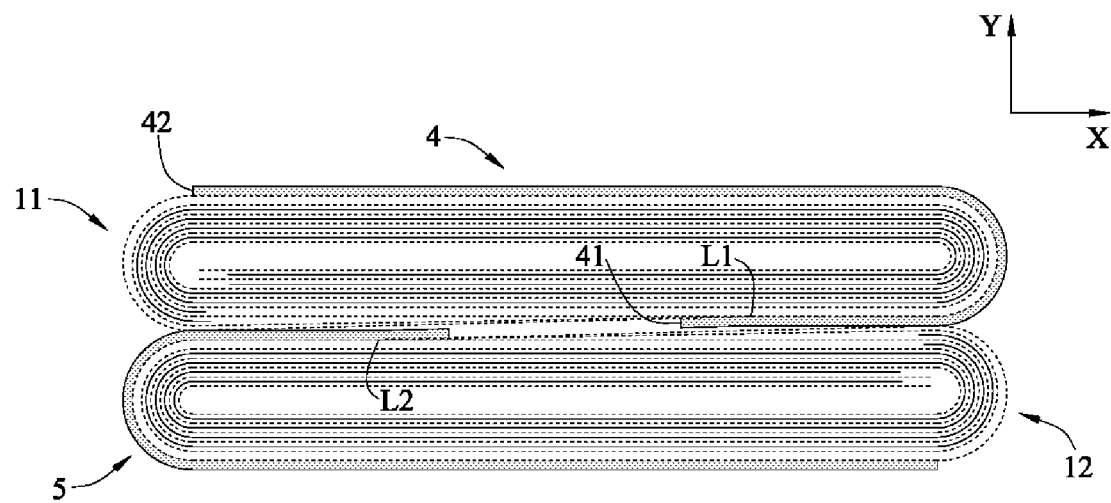
FIG. 10 is another schematic diagram of an electrode component and an insulating tape according to the present disclosure.

With reference to FIG. 10, in some embodiments, in a thickness direction Y, a portion of a first insulating tape 4 that is bonded to a second flat surface 112 does not overlap with a portion of a second insulating tape 5 that is bonded to a fourth flat surface 122. These embodiments can render smaller space occupied by the first insulating tape 4 and the second insulating tape 5 in the thickness direction Y, which increases an energy density.

Figure 11:
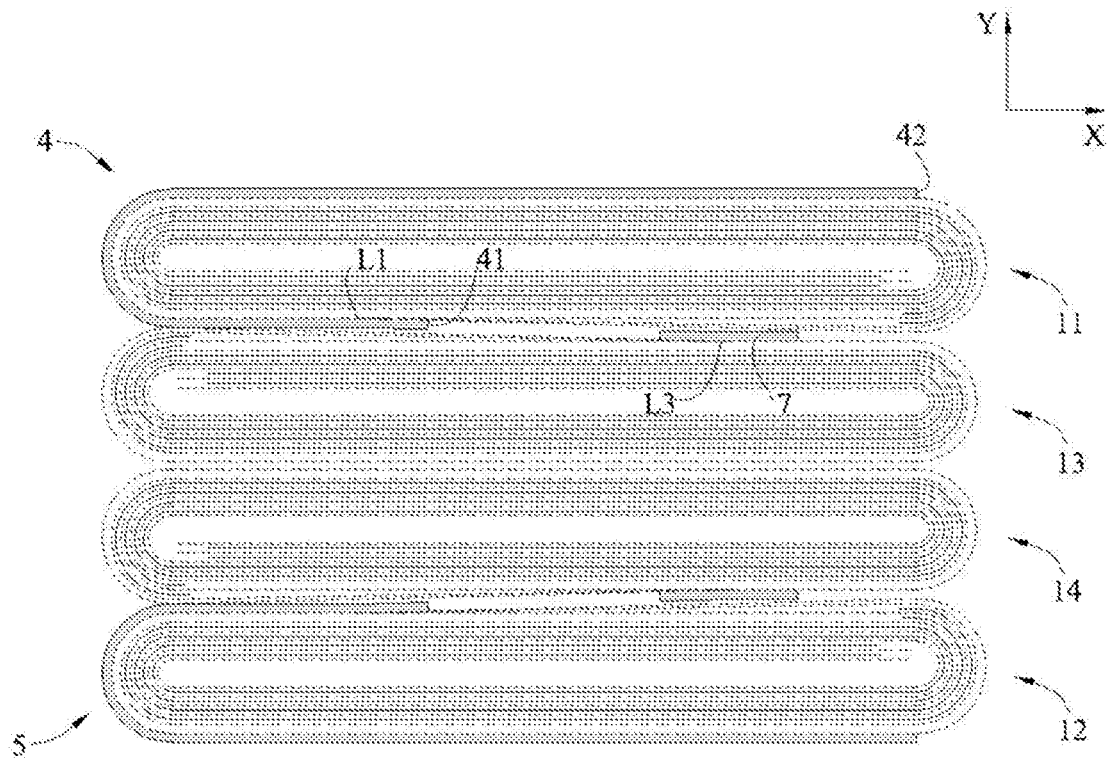
FIG. 11 is another schematic diagram of an electrode component and an insulating tape according to the present disclosure.

With reference to FIG. 11, in some embodiments, an electrode component 1 further includes a third electrode unit 13 and a fourth electrode unit 14; and a first electrode unit 11, a third electrode unit 13, a fourth electrode unit 14 and a second electrode unit 12 are stacked together sequentially.

Since the third electrode unit 13 and the fourth electrode unit 14 are located between the first electrode unit 11 and the second electrode unit 12, metal foreign matter generated during soldering is less likely to adhere to a flat surface of the third electrode unit 13 and a flat surface of the fourth electrode unit 14. That is to say, it is only necessary to bond an insulating tape at a termination line of the third electrode unit 13 and at a termination line of the fourth electrode unit 14.

What is claimed is:

1. A secondary battery, comprising: an electrode component, a case, a top cover component, a first insulating tape, and a second insulating tape; wherein, the electrode component comprises a first electrode unit and a second electrode unit; the first electrode unit is located at one end of the electrode component in a thickness direction (Y); the second electrode unit is located at the other end of the electrode component in the thickness direction (Y);

the first electrode unit comprises a positive plate, a negative plate and a separator; and the separator is configured to separate the positive plate from the negative plate; the first electrode unit is wound into a flat structure and has a first termination line (L1) formed at a winding tail-end; a negative plate of an outermost circle of the first electrode unit is located outside a positive plate of an outermost circle of the first electrode unit; and the first insulating tape at least covers a portion of the first termination line (L1);

the case has a first side wall and an accommodating cavity; the electrode component is accommodated in the accommodating cavity; the first side wall is located at one side of the electrode component in a thickness direction (Y); the case is electrically connected with the positive plate of the first electrode unit; and the top cover component is sealingly connected with the case;

a surface of the first electrode unit comprises a first flat surface and a second flat surface; the first flat surface is located at one end of the first electrode unit that is close to the first side wall in the thickness direction (Y); the second flat surface is located at one end of the first electrode unit that is away from the first side wall in the thickness direction (Y); and the first insulating tape is at least partially in close contact with the first flat surface;

the second electrode unit comprises a third flat surface and a fourth flat surface; the fourth flat surface is located at one end of the second electrode unit that is close to the first electrode unit in the thickness direction (Y); and in the thickness direction (Y), a portion of the first insulating tape that is bonded to the second flat surface does not overlap with a portion of the second insulating tape that is bonded to the fourth flat surface.

2. The secondary battery according to claim 1, wherein, the surface of the first electrode unit further comprises a first narrow surface and a second narrow surface; the first narrow surface and the second narrow surface are respectively located at both ends of the first electrode unit in a width direction (X); the first flat surface, the second narrow surface, the second flat surface and the first narrow surface are sequentially arranged in a winding direction of the first electrode unit;
both the first termination line (L1) and a starting end of the first insulating tape are located on the second flat surface;
the first insulating tape extends from the starting end and is sequentially wound over the first termination line (L1) and the first narrow surface in the winding direction of the first electrode unit.

3. The secondary battery according to claim 2, wherein, a trailing end of the first insulating tape is located on the first flat surface and provided close to a boundary between the first flat surface and the second narrow surface; or,
the first insulating tape extends, wound over the second narrow surface, and has its trailing end located on the second flat surface in the winding direction of the first electrode unit.

4. The secondary battery according to claim 2, wherein, in the width direction (X) of the first electrode unit, a distance between the starting end of the first insulating tape and the first termination line (L1) is greater than 0.5 cm.

5. The secondary battery according to claim 2, wherein, an area of the first insulating tape is S1; a sum of areas of the first flat surface, the second flat surface, the first narrow surface and the second narrow surface is S2; and a ratio of S1 to S2 is 50% to 90%.

6. The secondary battery according to claim 2, wherein, the second electrode unit comprises a positive plate, a negative plate and a separator; and the separator is configured to separate the positive plate from the negative plate;
the second electrode unit is wound into a flat structure and has a second termination line (L2) formed at a winding tail-end; and a negative plate of an outermost circle of the second electrode unit is located outside a positive plate of an outermost circle of the second electrode unit;
the second insulating tape at least covers a portion of the second termination line (L2);
the case further has a second side wall, and the second side wall is located at the other side of the electrode component in the thickness direction (Y); and
the third flat surface is located at one end of the second electrode unit that is close to the second side wall in the thickness direction (Y); and the second insulating tape is at least partially in close contact with the third flat surface.

7. The secondary battery according to claim 6, wherein, both a starting end of the second insulating tape and the second termination line (L2) are located on the fourth flat surface.

8. The secondary battery according to claim 6, wherein, the negative plate of the first electrode unit comprises a negative electrode current collector and two negative electrode active material layers respectively coated on two surfaces of the negative electrode current collector;
the first electrode unit has two end faces provided opposite each other in a length direction (Z) parallel to a winding shaft of the first electrode unit; and
in the length direction (Z), an edge of the first insulating tape exceeds the negative electrode active material layers and does not exceed the end face;
and
the negative plate of the second electrode unit comprises a negative electrode current collector and two negative electrode active material layers respectively coated on two surfaces of the negative electrode current collector;
the second electrode unit has two end faces provided opposite each other along a length direction (Z) parallel to a winding shaft of the second electrode unit; and
in the length direction (Z), an edge of the second insulating tape exceeds the negative electrode active material layers and does not exceed the end face.

9. The secondary battery according to claim 6, wherein, the separator of an outermost circle of the first electrode unit is located outside a negative plate of an outermost circle of the first electrode unit;
the positive plate of the first electrode unit comprises a positive electrode current collector and two positive electrode active material layers respectively coated on two surfaces of the positive electrode current collector;
in the length direction (Z), an edge of the negative electrode active material layers exceeds the positive electrode active material layers, and an edge of the separator exceeds the negative electrode active material layers;
and
the negative plate of the second electrode unit comprises a negative electrode current collector and two negative electrode active material layers respectively coated on two surfaces of the negative electrode current collector;
the second electrode unit has two end faces provided opposite each other along a length direction (Z) parallel to a winding shaft of the second electrode unit; and
in the length direction (Z), an edge of the second insulating tape exceeds the negative electrode active material layers and does not exceed the end face.

10. The secondary battery according to claim 6, wherein, the first insulating tape comprises a base body and a bonding layer, and the base body is bonded to the surface of the first electrode unit through the bonding layer; and
the second insulating tape comprises a base body and a bonding layer, and the base body is bonded to the surface of the second electrode unit through the bonding layer.

11. The secondary battery according to claim 10, wherein, the base body has a thickness of 10 µm to 50 µm, and an elastic modulus of 1 Gpa to 6 Gpa; and
the bonding layer has a thickness of 0.5 µm to 15 µm, and a bonding strength greater than 0.05 N/mm².

12. The secondary battery according to claim 6, wherein, the secondary battery further comprises a protective member located inside the case, and the protective member is configured to separate the electrode component, the first insulating tape and the second insulating tape from the case.

13. The secondary battery according to claim 6, wherein, the electrode component further comprises a plurality of third electrode units, and the plurality of third electrode units are located between the first electrode unit and the second electrode unit; each third electrode unit is bonded with a third insulating tape at a termination line of each third electrode unit.

14. The secondary battery according to claim 1, wherein, the negative plate of the first electrode unit comprises a negative electrode current collector and two negative electrode active material layers respectively coated on two surfaces of the negative electrode current collector;

the first electrode unit has two end faces provided opposite each other in a length direction (Z) parallel to a winding shaft of the first electrode unit; and in the length direction (Z), an edge of the first insulating tape exceeds the negative electrode active material layers and does not exceed the end face.

15. The secondary battery according to claim 14, wherein, the separator of an outermost circle of the first electrode unit is located outside a negative plate of an outermost circle of the first electrode unit;

the positive plate of the first electrode unit comprises a positive electrode current collector and two positive electrode active material layers respectively coated on two surfaces of the positive electrode current collector;

in the length direction (Z), an edge of the negative electrode active material layers exceeds the positive electrode active material layers, and an edge of the separator exceeds the negative electrode active material layers.

16. The secondary battery according to claim 1, wherein, the first insulating tape comprises a base body and a bonding layer, and the base body is bonded to the surface of the first electrode unit through the bonding layer.

17. The secondary battery according to claim 16, wherein, the base body has a thickness of 10 μm to 50 μm, and an elastic modulus of 1 Gpa to 6 Gpa; and the bonding layer has a thickness of 0.5 μm to 15 μm, and a bonding strength greater than 0.05 N/mm$^2$.

18. The secondary battery according to claim 1, wherein, the secondary battery further comprises a protective member located inside the case, and the protective member is configured to separate the electrode component and the first insulating tape from the case.

* * * * *